United States Patent
Gupta et al.

(10) Patent No.: US 11,775,353 B2
(45) Date of Patent: Oct. 3, 2023

(54) MAPPING WORKLOADS TO CLOUD INFRASTRUCTURE

(71) Applicant: Schlumberger Technology Corporation, Sugar Land, TX (US)

(72) Inventors: Abhishek Gupta, San Jose, CA (US); Kishore Mulchandani, Henderson, NV (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 405 days.

(21) Appl. No.: 16/949,271

(22) Filed: Oct. 22, 2020

(65) Prior Publication Data

US 2021/0124614 A1    Apr. 29, 2021

Related U.S. Application Data

(60) Provisional application No. 62/925,192, filed on Oct. 23, 2019.

(51) Int. Cl.
*G06F 9/50* (2006.01)
*G06F 11/34* (2006.01)

(52) U.S. Cl.
CPC ............ *G06F 9/5083* (2013.01); *G06F 9/505* (2013.01); *G06F 11/3409* (2013.01)

(58) Field of Classification Search
CPC ..... G06F 9/5083; G06F 9/505; G06F 11/3409
See application file for complete search history.

(56) References Cited

U.S. PATENT DOCUMENTS

| | | | |
|---|---|---|---|
| 10,262,236 B2 | 4/2019 | Lim et al. | |
| 10,452,441 B1 * | 10/2019 | Subramanian | G06F 40/279 |
| 10,634,807 B2 | 4/2020 | Tang et al. | |
| 10,755,483 B1 * | 8/2020 | Côté | G06T 7/579 |
| 11,105,942 B2 | 8/2021 | Alwon | |
| 11,520,077 B2 | 12/2022 | Denli et al. | |
| 2013/0093776 A1 * | 4/2013 | Chakraborty | G06F 9/452 345/520 |
| 2017/0006135 A1 * | 1/2017 | Siebel | G06Q 10/06 |
| 2017/0168729 A1 * | 6/2017 | Faulkner | G06F 3/0613 |
| 2019/0294473 A1 * | 9/2019 | Martin | G06F 9/5027 |
| 2020/0183032 A1 | 6/2020 | Liu et al. | |
| 2020/0208510 A1 | 7/2020 | Guijt et al. | |

(Continued)

OTHER PUBLICATIONS

Yeh et al., "Semantic Image Inpainting with Deep Generative Models," posted on arXiv on Jul. 26, 2016, accessed on Oct. 22,2020 https://arxiv.org/abs/1607.07539, 19 pages.

(Continued)

*Primary Examiner* — Benjamin C Wu
(74) *Attorney, Agent, or Firm* — Michael Guthrie

(57) ABSTRACT

A visualization request to visualize data is received. System parameters responsive to the visualization request are obtained. Predicted performance metrics are generated with a machine learning model using the system parameters. A workload server is obtained using a workload server profile selected using the predicted performance metrics, the workload server executing a visualization workload to generate a visualization. The visualization of the data is streamed, from the workload server to the client device, responsive to the visualization request.

20 Claims, 7 Drawing Sheets

(56) References Cited

U.S. PATENT DOCUMENTS

| | | |
|---|---|---|
| 2020/0292723 A1 | 9/2020 | Zhang et al. |
| 2020/0342068 A1* | 10/2020 | Cai .................. G06F 30/20 |
| 2021/0125312 A1 | 4/2021 | Mulchandani et al. |
| 2021/0150807 A1 | 5/2021 | Zhou et al. |
| 2021/0311221 A1 | 10/2021 | Roy et al. |
| 2022/0335317 A1* | 10/2022 | Segner .................. G06N 20/00 |
| 2022/0351403 A1 | 11/2022 | Jiang |

OTHER PUBLICATIONS

Brandon Amos, "Image Completion with Deep Learning in TensorFlow," http://bamos.github.io/2016/08/09/deep-completion/ accessed on Oct. 22, 2020, 32 pages.

Office Action issued in U.S. Appl. No. 16/949,269 dated Mar. 23, 2023, 21 pages.

Goodfellow et al., "Conditional generative adversarial nets", arXiv preprint arXiv:1411, 1784 (2014).

Oliveira et al., "Interpolating Seismic Data With Conditional Generative Adversarial Networks", IEEE Geoscience and Remote Sensing Letters, vol. 15, No. 12, Dec. 2018.

\* cited by examiner

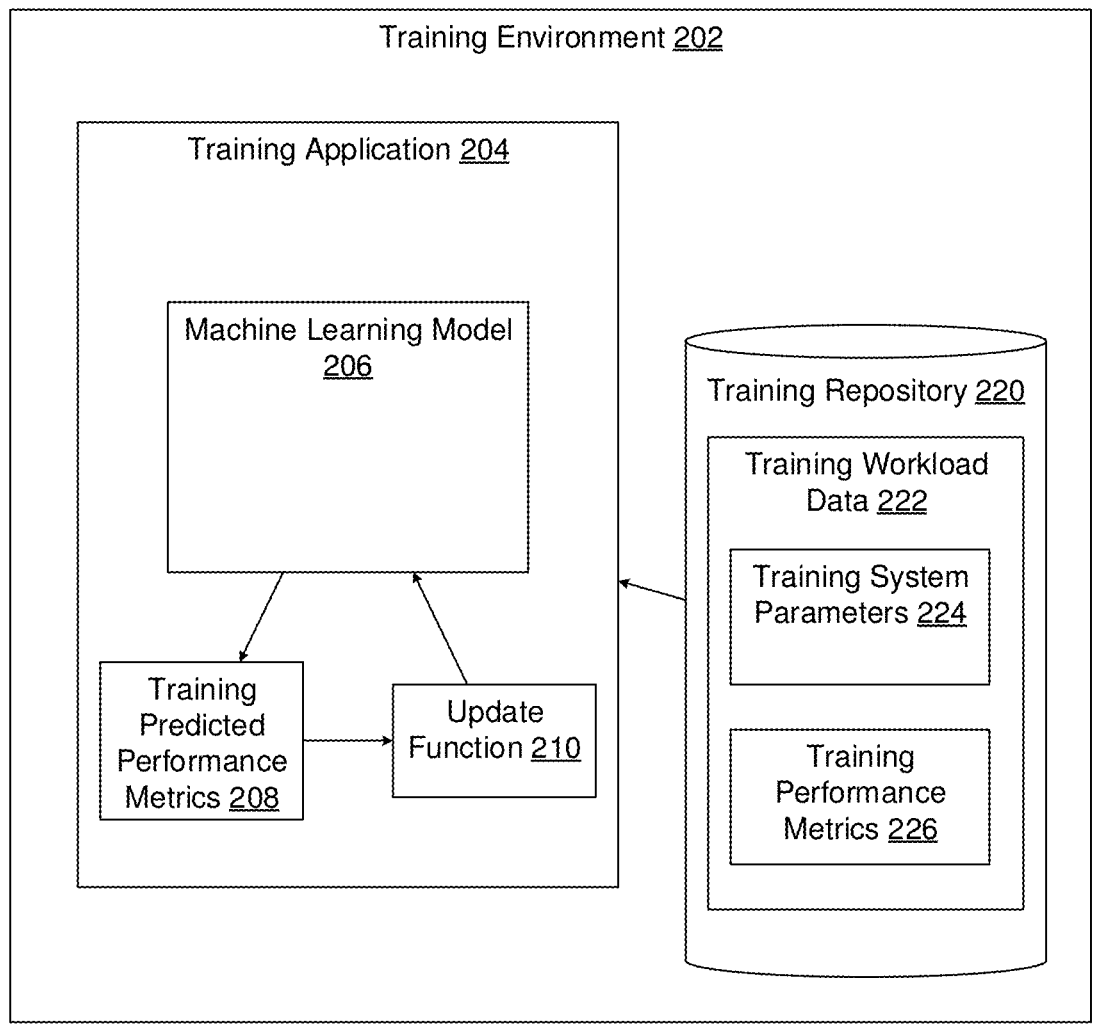
FIG. 2.1

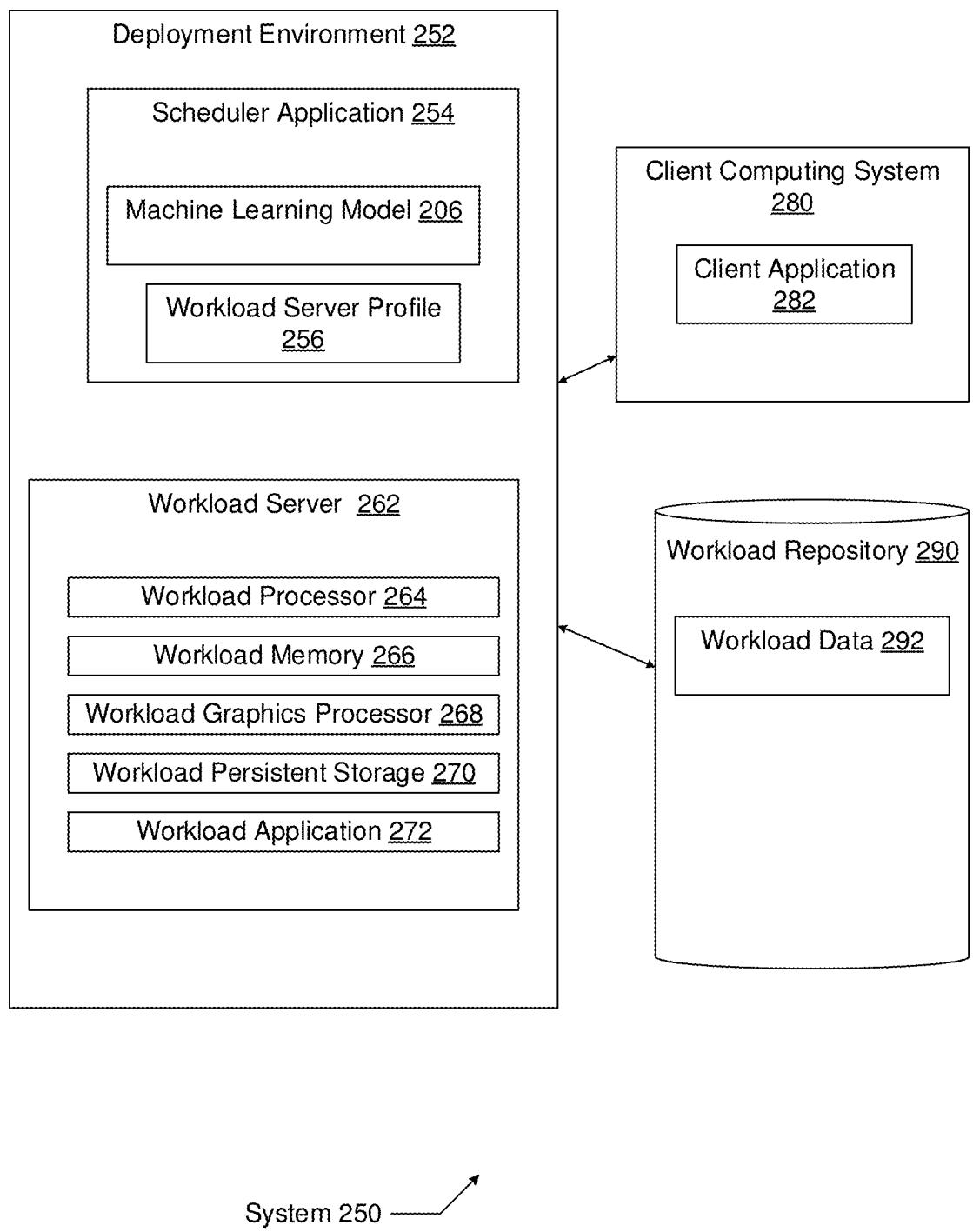
FIG. 2.2

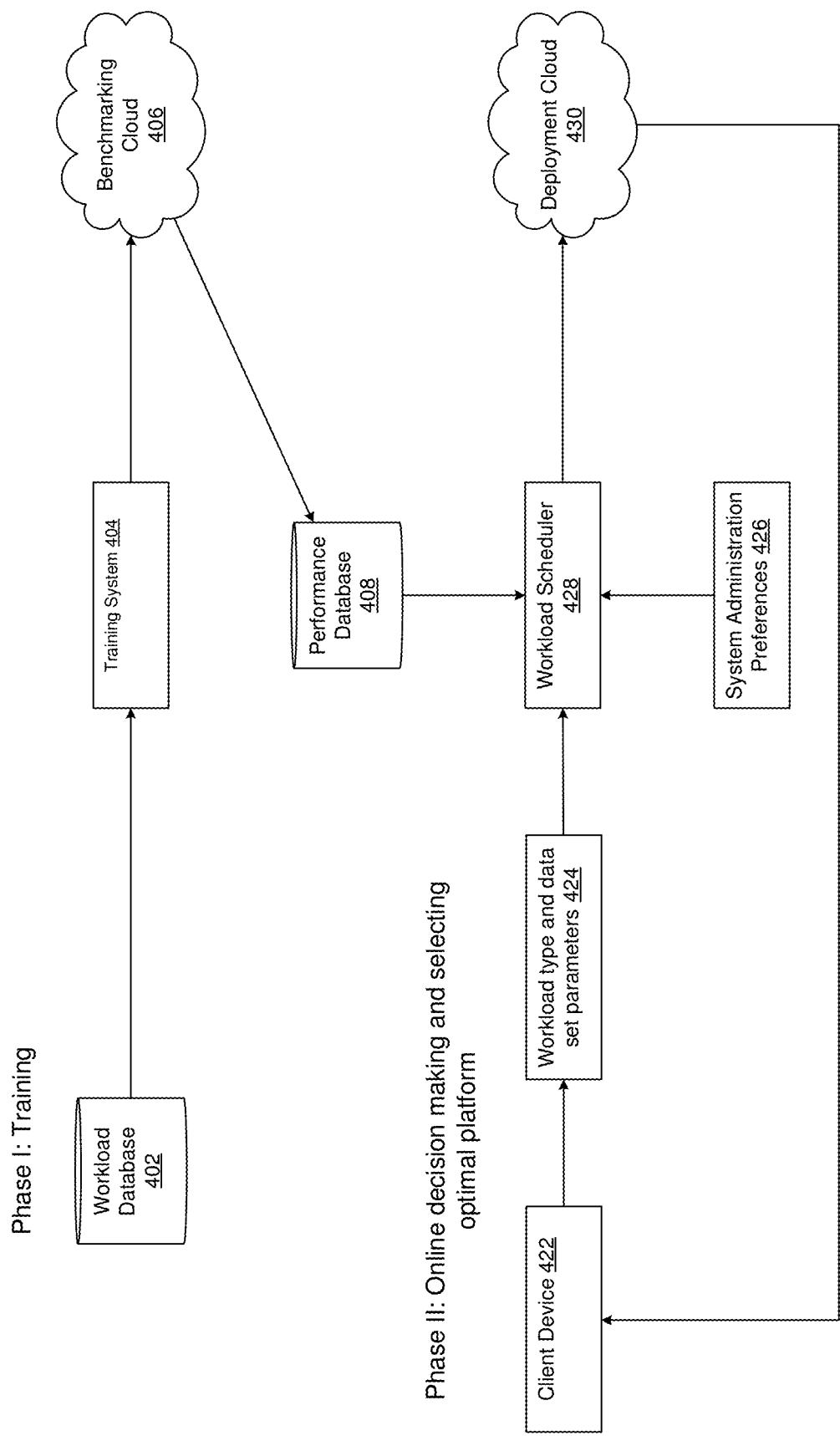
FIG. 4.1

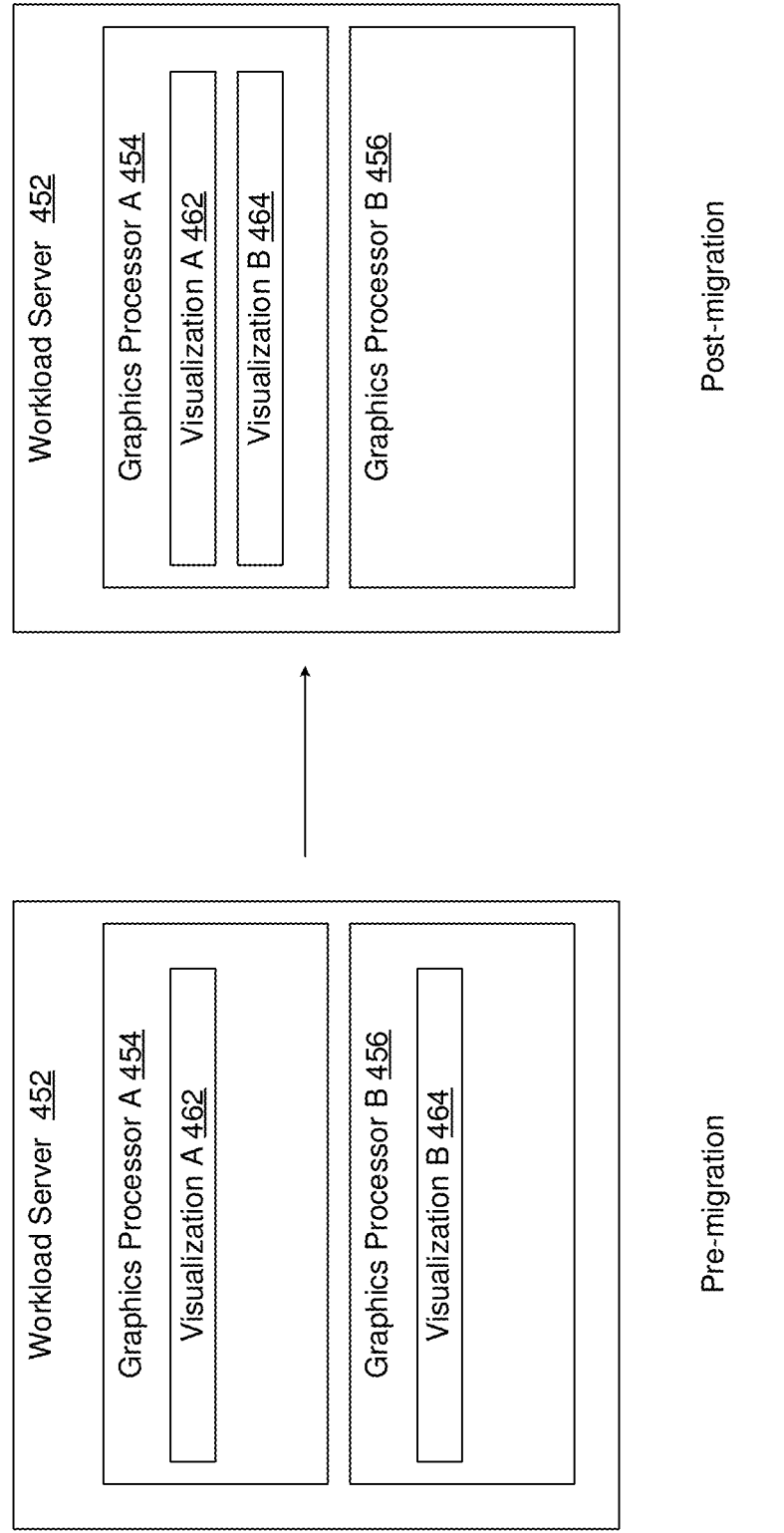
FIG. 4.2

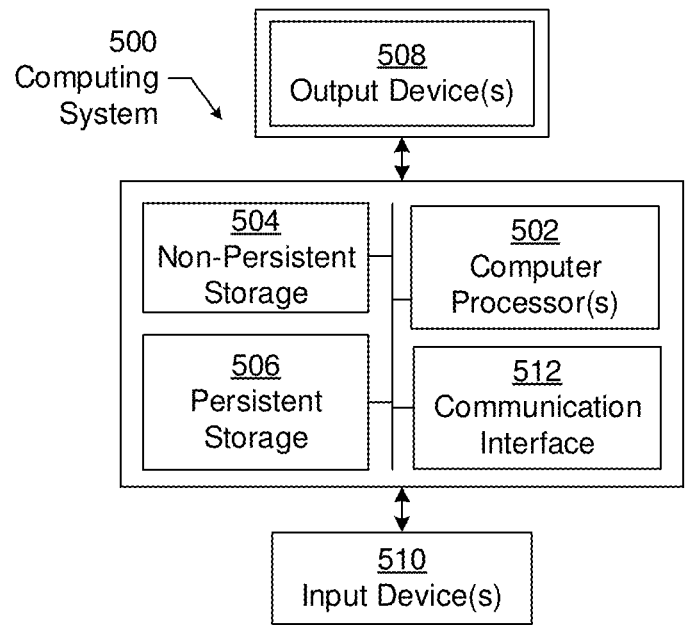
FIG. 5.1
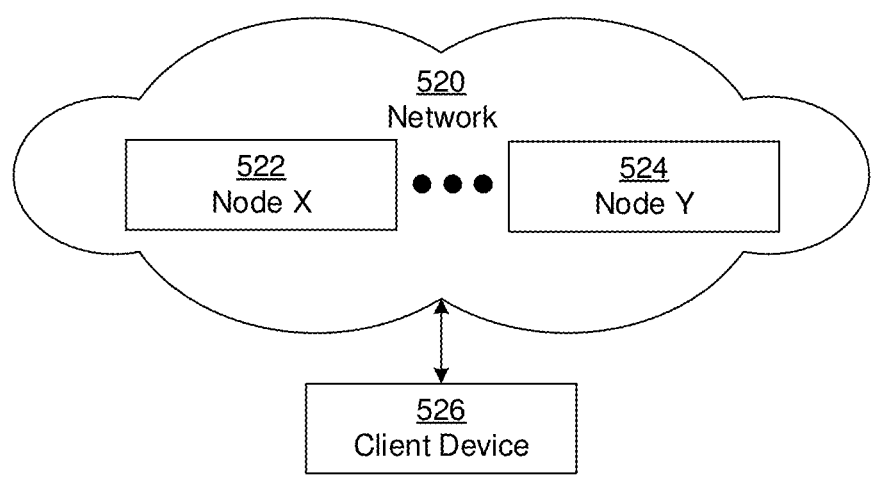
FIG. 5.2

MAPPING WORKLOADS TO CLOUD INFRASTRUCTURE

CROSS-REFERENCE TO RELATED APPLICATIONS

This patent claims priority from U.S. Provisional Patent Application No. 62/925,192 filed on Oct. 23, 2019. U.S. Provisional Patent Application No. 62/925,192 is hereby incorporated by reference.

BACKGROUND

Three dimensional (3D) visualization is used in many workflows. 3D visualization may be moved to the cloud and projects may rely on using 3D visualization in the cloud. 3D visualization in the cloud may use server-side rendering with graphics processing units (GPUs) in the cloud. A virtual machine (VM) in the cloud may support one user session and be provisioned with one full GPU. In some cases, containers are used with a 1:1 mapping from containers to VMs. However, visualization workflows may not be equal in terms of their computational demands and the system may allow for different mapping ratios. Also, in the cloud, there are multiple choices in terms of type and number of central processing unit (CPU), GPU, and memory options that may be provisioned for workloads.

Provisioning the same static type of compute resources for workloads with varying resource demands leads to a) a waste of resources when the workload demands few compute cycles or a partial GPU, and b) poor performance when the workload is heavy and could benefit from more compute cycles or a newer GPU version.

SUMMARY

In general, in one or more aspects, the disclosure relates to a method that includes receiving a visualization request to visualize data. System parameters responsive to the visualization request are obtained. Predicted performance metrics are generated with a machine learning model using the system parameters. A workload server is obtained using a workload server profile selected using the predicted performance metrics, the workload server executing a visualization workload to generate a visualization. The visualization of the data is streamed, from the workload server to the client device, responsive to the visualization request.

Other aspects of the disclosure will be apparent from the following description and the appended claims.

BRIEF DESCRIPTION OF DRAWINGS

FIG. 1, FIG. 2.1, and FIG. 2.2 show systems in accordance with disclosed embodiments.

FIG. 4.1 and FIG. 4.2 show examples in accordance with disclosed embodiments.

FIG. 5.1 and FIG. 5.2 show computing systems in accordance with disclosed embodiments.

DETAILED DESCRIPTION

Figure 1:
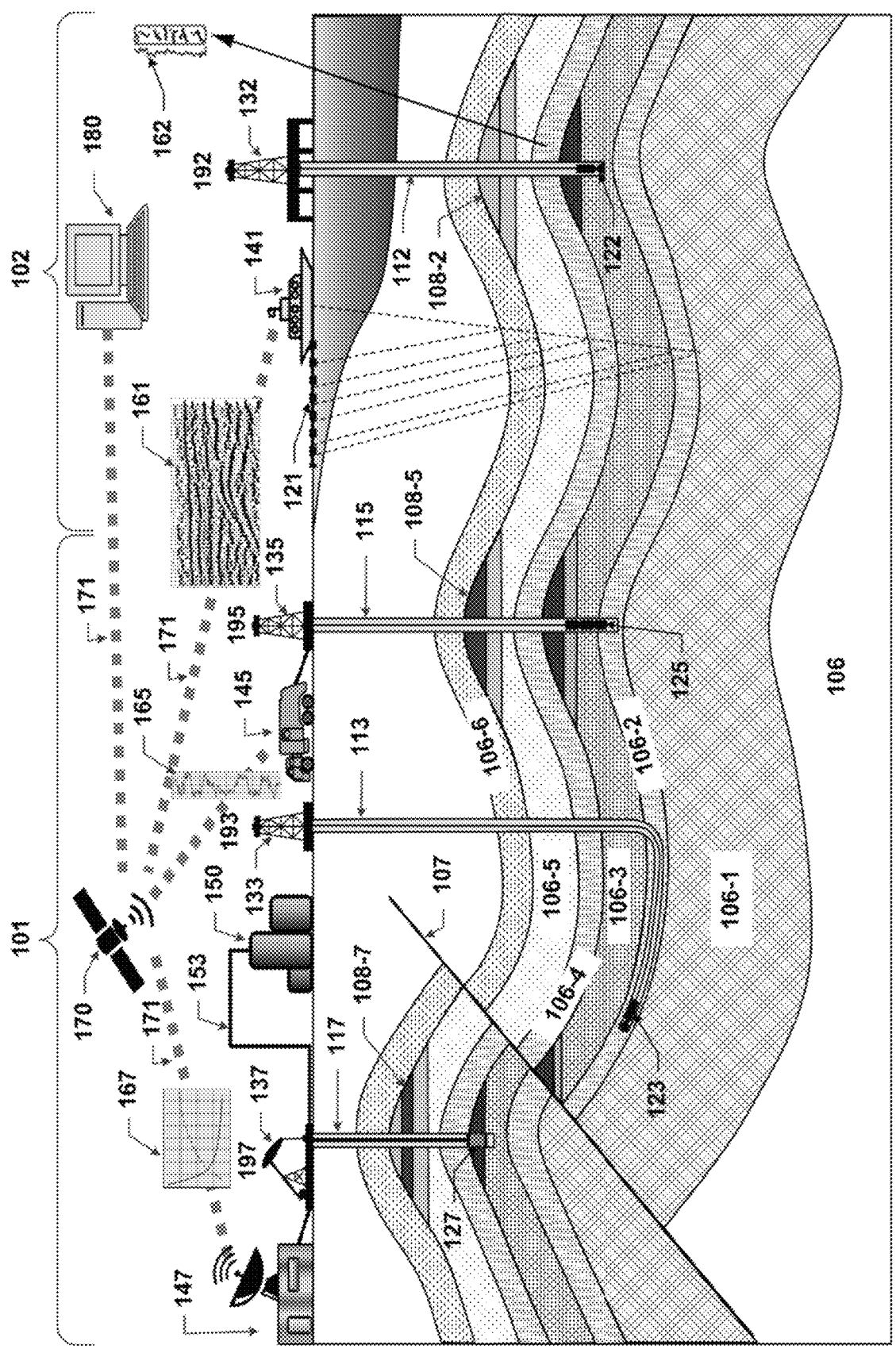

Specific embodiments will now be described in detail with reference to the accompanying figures. Like elements in the various figures are denoted by like reference numerals for consistency.

In the following detailed description of embodiments of the technology, numerous specific details are set forth in order to provide a more thorough understanding. However, it will be apparent to one of ordinary skill in the art that various embodiments may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to be a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, methods and systems according to the disclosure map three dimensional (3D) visualization workloads to containers using predicted performance metrics generated with a machine learning model. Mapping the workloads based on the machine learning model reduces waste of resources and reduces poor performance. Methods and systems according to the disclosure involve a) understanding visualization patterns and performance using machine learning models, b) using benchmarks to emulate access patterns of oilfield data types, and c) using the results from that learning to select the infrastructure for a 3D visualization job with trained machine learning models. The workloads may visualize subsurface data.

3D Visualization in the cloud may use server-side rendering, where the images are generated from data at the server and streamed to a client, or client-side rendering, where the models are streamed to the client and images rendered at the client. Hybrid approaches, which are combinations that use server-side rendering and client side rendering, may also be used. The rendering may use combinations of central processing units (CPUs) and graphics processing units (GPUs) or other specialized processors (tensor processing units (TPUs), field programmable gate arrays (FPGAs), application specific integrated circuits (ASICs), quantum processing units (QPUs), etc.). These resources may be shared across multiple virtual machines (VMs) or dedicated to individual virtual machines in both server and client computing systems.

System parameters describe several aspects of the systems used to render and display the 3D visualizations of data from GPU workloads. For example, system parameters may include server parameters, client parameters, and workload parameters.

The server parameters include hardware and software parameters that specify the hardware and software components used to render the workload data described by the workload parameters. For example, server parameters may include values for server location, server core count, server memory size, server network latency, server operating system, server partition size, server persistent storage size, server processor count, server processor type, server GPU driver version, server GPU memory size, server GPU partition size, server GPU type, virtual machine core count, virtual machine memory size, virtual machine partition size, virtual machine persistent storage size, virtual machine GPU driver version, virtual machine GPU memory size, container persistent storage size, container memory size, container GPU memory size, container core count, etc.

The client parameters include hardware and software parameters that specify the hardware and software components used by the client device to display the 3D visualizations rendered by the server as part of a GPU workload. For example, client parameters may include values for client location, idle time (e.g., time since last user input), client application core count, client application GPU memory size, client application memory size, client application persistent storage size, client application processor count, client application type, client network latency, client operating system, client system core count, client system memory size, client system persistent storage size, client system processor count, client system processor type, client system GPU driver version, client system GPU memory size, client system GPU type, etc.

The workload parameters describe the GPU workload rendered by the server and displayed by the client. For example, workload parameters may include values for workload data location, workload application type, workload data depth, workload data resolution, workload data shape, workload data size, workload data type, workload type, workload visualization type, etc.

Performance metrics measure the system performance of a visualization on a client device. Performance metrics include server frames per second (FPS), client frames per second, initial client lag (e.g., the time between starting a workload on a server and displaying a first image of the visualization on the client), average server network latency, average client network latency, average round trip network latency, average movement lag (the time between a change in input, e.g., a mouse movement, and a display update based on the change in input), etc.

The server, client, and workload data may each be in different locations. For some workloads, having the workload data and the server being near each other (colocated, in the same data center, in the same geographical location, etc.) and remote to the client may yield improved performance metrics as compared to having the workload data and the client being near each other and remote to the server. For other workloads, the reverse may be true.

A workload is a 3D visualization task. A workload uses CPU, GPU, memory, and storage resources to create the 3D visualization that is presented on a client computing system. The 3D visualization task may include rendering data that is subsurface data that includes geological data.

Turning to the figures, FIG. 1 depicts a schematic view, partially in cross section, of an onshore field (101) and an offshore field (102) in which one or more embodiments may be implemented. The embodiments of FIG. 1 may include the features and embodiments described in the other figures of the application. One or more of the modules and elements shown in FIG. 1 may be omitted, repeated, and/or substituted. Accordingly, embodiments should not be considered limited to the specific arrangement of modules shown in FIG. 1.

As shown in FIG. 1, the fields (101), (102) include a geologic sedimentary basin (106), wellsite systems (192), (193), (195), (197), wellbores (112), (113), (115), (117), data acquisition tools (121), (123), (125), (127), surface units (141), (145), (147), well rigs (132), (133), (135), production equipment (137), surface storage tanks (150), production pipelines (153), and an E&P computer system (180) connected to the data acquisition tools (121), (123), (125), (127), through communication links (171) managed by a communication relay (170).

The geologic sedimentary basin (106) contains subterranean formations. As shown in FIG. 1, the subterranean formations may include several geological layers (106-1 through 106-6). As shown, the formation may include a basement layer (106-1), one or more shale layers (106-2, 106-4, 106-6), a limestone layer (106-3), a sandstone layer (106-5), and any other geological layer. A fault plane (107) may extend through the formations. In particular, the geologic sedimentary basin includes rock formations and may include at least one reservoir including fluids, for example, the sandstone layer (106-5). The rock formations may include at least one seal rock, for example, the shale layer (106-6), which may act as a top seal. The rock formations may include at least one source rock, for example, the shale layer (106-4), which may act as a hydrocarbon generation source. The geologic sedimentary basin (106) may further contain hydrocarbon or other fluids accumulations associated with certain features of the subsurface formations. For example, accumulations (108-2), (108-5), and (108-7) associated with structural high areas of the reservoir layer (106-5) and containing gas, oil, water or any combination of these fluids.

Data acquisition tools (121), (123), (125), and (127), may be positioned at various locations along the field (101) or field (102) for collecting data from the subterranean formations of the geologic sedimentary basin (106), referred to as survey or logging operations. In particular, various data acquisition tools are 'adapted to measure the formation and detect the physical properties of the rocks, subsurface formations, fluids contained within the rock matrix and the geological structures of the formation. For example, data plots (161), (162), (165), and (167) are depicted along the fields (101) and (102) to demonstrate the data generated by the data acquisition tools. Specifically, the static data plot (161) is a seismic two-way response time. Static data plot (162) is core sample data measured from a core sample of any of subterranean formations (106-1 to 106-6). Static data plot (165) is a logging trace, referred to as a well log. Production decline curve or graph (167) is a dynamic data plot of the fluid flow rate over time. Other data may also be collected, such as historical data, analyst user inputs, economic information, and/or other measurement data and other parameters of interest.

The acquisition of data shown in FIG. 1 may be performed at various stages of planning a well. For example, during early exploration stages, seismic data may be gathered from the surface to identify possible locations of hydrocarbons. The seismic data may be gathered using a seismic source that generates a controlled amount of seismic energy. In other words, the seismic source and corresponding sensors (121) are an example of a data acquisition tool. An example of seismic data acquisition tool is a seismic acquisition vessel (141) that generates and sends seismic waves below the surface of the earth. Sensors (121) and other equipment located at the field may include functionality to detect the resulting raw seismic signal and transmit raw seismic data to a surface unit, e.g., the seismic acquisition vessel (141). The resulting raw seismic data may include effects of seismic wave reflecting from the subterranean formations (106-1 to 106-6).

After gathering the seismic data and analyzing the seismic data, additional data acquisition tools may be employed to gather additional data. Data acquisition may be performed at various stages in the process. The data acquisition and corresponding analysis may be used to determine where and how to perform drilling, production, and completion operations to gather downhole hydrocarbons from the field. Generally, survey operations, wellbore operations and production operations are referred to as field operations of the field (101) or (102). These field operations may be performed as directed by the surface units (141), (145), (147). For example, the field operation equipment may be controlled by a field operation control signal that is sent from the surface unit.

Further as shown in FIG. 1, the fields (101) and (102) include one or more wellsite systems (192), (193), (195), and (197). A wellsite system is associated with a rig or a production equipment, a wellbore, and other wellsite equipment configured to perform wellbore operations, such as logging, drilling, fracturing, production, or other applicable operations. For example, the wellsite system (192) is associated with a rig (132), a wellbore (112), and drilling equipment to perform drilling operation (122). A wellsite system may be connected to a production equipment. For example, the well system (197) is connected to the surface storage tank (150) through the fluids transport pipeline (153).

The surface units (141), (145), and (147), may be operatively coupled to the data acquisition tools (121), (123), (125), (127), and/or the wellsite systems (192), (193), (195), and (197). In particular, the surface unit is configured to send commands to the data acquisition tools and/or the wellsite systems and to receive data therefrom. The surface units may be located at the wellsite system and/or remote locations. The surface units may be provided with computer facilities (e.g., an E&P computer system) for receiving, storing, processing, and/or analyzing data from the data acquisition tools, the wellsite systems, and/or other parts of the field (101) or (102). The surface unit may also be provided with, or have functionality for actuating, mechanisms of the wellsite system components. The surface unit may then send command signals to the wellsite system components in response to data received, stored, processed, and/or analyzed, for example, to control and/or optimize various field operations described above.

The surface units (141), (145), and (147) may be communicatively coupled to the E&P computer system (180) via the communication links (171). The communication between the surface units and the E&P computer system (180) may be managed through a communication relay (170). For example, a satellite, tower antenna or any other type of communication relay may be used to gather data from multiple surface units and transfer the data to a remote E&P computer system (180) for further analysis. Generally, the E&P computer system (180) is configured to analyze, model, control, optimize, or perform management tasks of the aforementioned field operations based on the data provided from the surface unit. The E&P computer system (180) may be provided with functionality for manipulating and analyzing the data, such as analyzing seismic data to determine locations of hydrocarbons in the geologic sedimentary basin (106) or performing simulation, planning, and optimization of E&P operations of the wellsite system. The results generated by the E&P computer system (180) may be displayed for a user to view the results in a two-dimensional (2D) display, three-dimensional (3D) display, or other suitable displays. Although the surface units are shown as separate from the E&P computer system (180) in FIG. 1, in other examples, the surface unit and the E&P computer system (180) may also be combined. The E&P computer system (180) and/or surface unit may correspond to a computing system, such as the computing system shown in FIGS. 5.1 and 5.2 and described below.

FIG. 2.1 and FIG. 2.2 show diagrams of embodiments that are in accordance with the disclosure. FIG. 2.1 shows the training system (200) that trains machine learning models for mapping graphics processing unit (GPU) workloads. FIG. 2.2 shows the system (250) that deploys machine learning models for mapping graphics processing unit (GPU) workloads. The embodiments of FIG. 2.1 and FIG. 2.2 may be combined and may include or be included within the features and embodiments described in the other figures of the application. The features and elements of FIG. 2.1 and FIG. 2.2 are, individually and as a combination, improvements to the technology of machine learning, 3D virtualization of workloads, and GPU workload mapping. The various elements, systems, and components shown in FIG. 2.1 and FIG. 2.2 may be omitted, repeated, combined, and/or altered as shown from FIG. 2.1 and FIG. 2.2. Accordingly, the scope of the present disclosure should not be considered limited to the specific arrangements shown in FIG. 2.1 and FIG. 2.2.

Turning to FIG. 2.1, the training system (200) includes the training environment (202). The training environment (202) includes the hardware and software components to train the machine learning model (206) to generate performance metrics. The training environment (202) may include multiple computing systems in accordance with those described in FIGS. 5.1 and 5.2 and, for example, may include smartphones, desktop computers, server computers, etc. The training environment (202) may include a cloud computing environment with multiple servers that host the training application (204) and the training repository (220). The cloud computing environment may be operated by a cloud services provider that provides hosting, virtualization, and data storage services as well as other cloud services. The training environment (202) may be a single computing system that trains the machine learning model (206) or may include multiple computing systems that train the machine learning model (206).

The training application (204) is a set of programs stored in the memory and executing on at least one processor of the training environment (202). The training application (204) loads the machine learning model (206), loads the training workload data (222), and trains the machine learning model (206) with the training workload data (222). The training application (204) processes the training workload data (222) to generate the input for the machine learning model (206). In one embodiment, the training application (204) extracts the training system parameters (224) (described below) and the training performance metrics (226) (described below) from multiple databases that form the training repository (220) and generates a data structure that is used to train the machine learning model (206). For example, the data structure may be a table with columns for the training system parameters (224), additional columns for the training performance metrics (226), with each row containing input data (the training system parameters (224)) and expected outputs or labels (the training performance metrics (226)).

The machine learning model (206) is a set of programs and data structures loaded by the training application (204). The machine learning model (206) receives the training workload data (222) and generates the training predicted performance metrics (208). The machine learning model (206) receives weight updates from the update function (210). In one embodiment, the machine learning model (206) is a neural network model. For example, the machine learning model (206) may include multiple fully connected layers that output the training predicted performance metrics (208) in response to receiving the training system parameters (224).

The training predicted performance metrics (208) are the output from the machine learning model (206). The training predicted performance metrics (208) have the same dimensions and data types as the training performance metrics (226). The training predicted performance metrics (208) may include one or more floating point values, integers, binary values, etc. As an example, the training predicted performance metrics (208) may include a frames per second value that is a prediction of the frames per second expected to be achieved by a system with the workload defined with one set of the training system parameters (224).

The update function (210) is a function that generates updates for the machine learning model (206) from the training predicted performance metrics (208). In one embodiment, the update function (210) uses a loss function to compare the training predicted performance metrics (208) to the set of training performance metrics (226) that correspond to the set of training system parameters (224) that were input to the machine learning model (206).

The training repository (220) is a computing system in the training environment (202) that may include multiple computing devices in accordance with the computing system (500) and the nodes (522 and 524) described below in FIGS. 5.1 and 5.2. The training repository (220) may be hosted by a cloud services provider. The cloud services provider may provide hosting, virtualization, and data storage services as well as other cloud services that are used to operate and control the data, programs, and applications that store and retrieve data from the training repository (220). The data in the training repository (220) includes the training workload data (222).

The training workload data (222) is data that is used to train the machine learning model (206). The training workload data (222) includes the training system parameters (224) and the training performance metrics (226).

The training system parameters (224) are the system parameters used to train the machine learning model. A set of system parameters from the training system parameters (224) may include server parameters, client parameters, and workload parameters.

The training performance metrics (226) are the performance metrics used to train the machine learning model (206). A set of performance metrics in the training performance metrics (226) may include multiple performance metrics (e.g., frames per second, initial lag, network latency, etc.).

Turning to FIG. 2.2, the system (250) includes the deployment environment (252). The deployment environment (252) includes the hardware and software components to use the machine learning model (206) to map GPU workloads to computing infrastructure. The deployment environment (252) may include multiple computing systems in accordance with those described in FIGS. 5.1 and 5.2 and, for example, may include smartphones, desktop computers, server computers, etc. The deployment environment (252) may include a cloud computing environment with multiple servers that host the scheduler application (254) and form the workload repository (290). The cloud computing environment may be operated by a cloud services provider that provides hosting, virtualization, and data storage services as well as other cloud services. The deployment environment (252) may be a single computing system that deploys the machine learning model (206) or may include multiple computing systems that deploy the machine learning model (206).

The scheduler application (254) is a set of programs stored in the memory and executing on at least one processor of a server in the deployment environment (252). The scheduler application (254) loads the machine learning model (206), receives and responds to workload requests from the client computing system (280), identifies the workload server profile (256) using the machine learning model (206), and schedules workloads to the workload server (262).

The workload server profile (256) may include server parameters and workload parameters. The server parameters in the workload server profile (256) may identify the hardware and software components of the workload server (262) for a workload described by the workload parameters in the workload server profile (256). The workload parameter in the workload server profile (256) may identify the workload data (292) in the workload repository (290) and specify formats, shapes, depths, etc., of the workload data (292) to be used by the workload server (262).

The machine learning model (206) was trained by the training application (204) (shown in FIG. 2.1). The machine learning model (206) receives system parameters and generates predicted performance metrics used by the scheduler application to create the workload server profile (256).

The workload server (262) is a server that satisfies the workload server profile (256) to execute the workload identified in a request from the client computing system (280). The workload server (262) includes the workload processor (264), the workload memory (266), the workload graphics processor (268), the workload persistent storage (270), and the workload application (272).

The workload processor (264) executes the programs running on the workload server (262), including the programs that form the workloads and visualizations that are responsive to requests from client computing systems. The workload processor (264) may include multiple central processing units (CPUs) with multiple cores.

The workload memory (266) stores the programs and data structures used by the workload server (262). The workload memory (266) may store a portion of the workload data (292).

The workload graphics processor (268) executes the graphical workloads running on the workload server (262), including the workloads and visualizations that are responsive to requests from client computing systems. The workload graphics processor (268) may include multiple graphics processing units (GPUs).

The workload persistent storage (270) stores data being used by the workload server (262). The workload persistent storage (270) may store a portion of the workload data (292).

The workload application (272) is a set of programs that form the workload to generate the visualization for the client computing system (280). The workload application (272) may retrieve the workload data (292) from the workload repository (290) and execute on the workload processor (264) and on the workload graphics processor (268). The workload application (272) may include programs that form the virtual machine, the container, and the graphical application that run the workload to generate the visualization that is streamed to the client computing system (280).

The workload repository (290) is a computing system in the deployment environment (252) that may include multiple computing devices in accordance with the computing system (500) and the nodes (522 and 524) described below in FIGS. 5.1 and 5.2. The workload repository (290) may be hosted by a cloud services provider. The cloud services provider may provide hosting, virtualization, and data storage services as well as other cloud services that are used to control the data, programs, and applications that store and retrieve data from the workload repository (290). The data in the workload repository (290) includes the workload data (292).

The workload data (292) is data used for visualizations requested by the client computing system (280). The workload data (292) may include data that is subsurface data from a wellsite.

Figure 3:
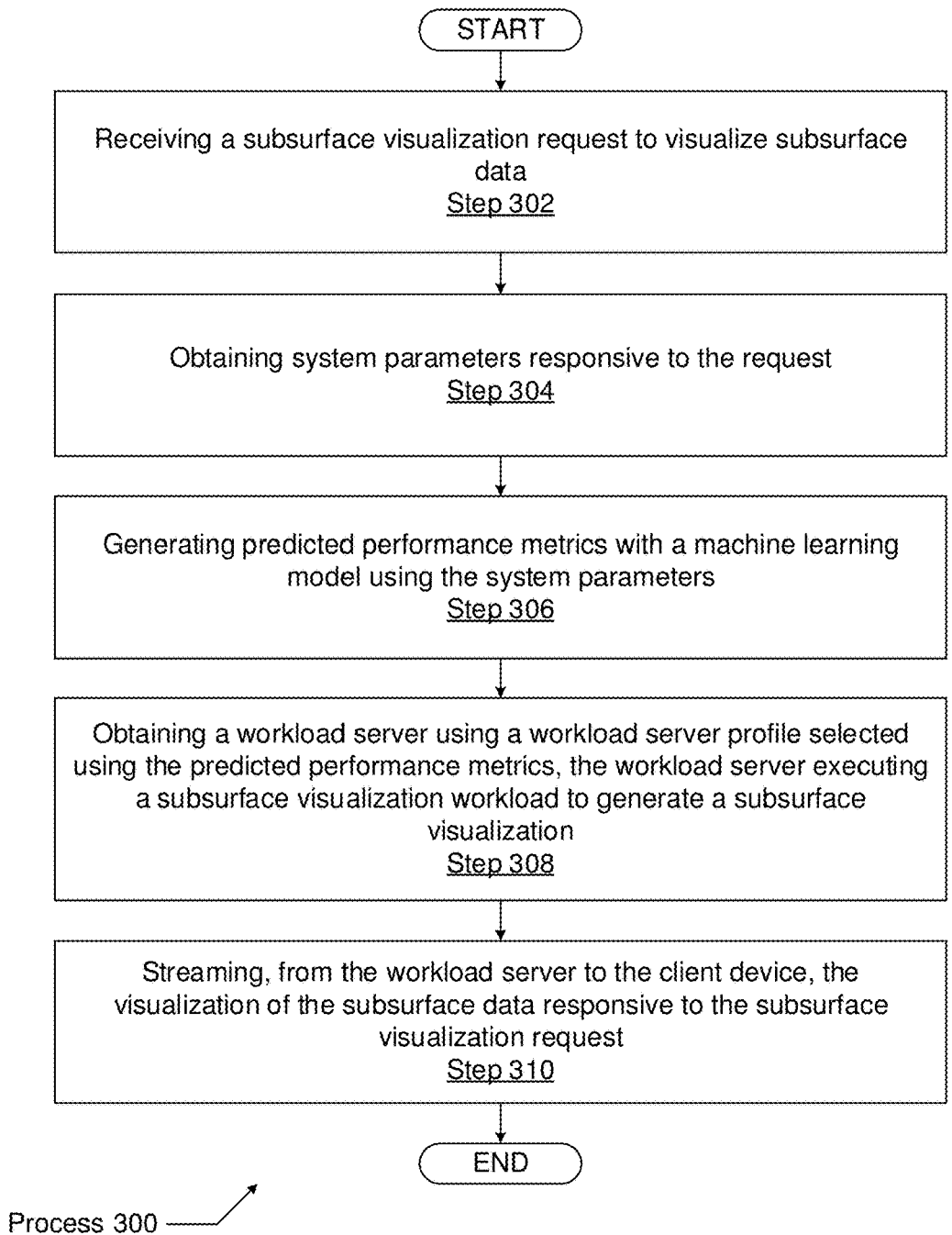
FIG. 3 shows a flowchart in accordance with disclosed embodiments.

FIG. 3 shows a flowchart in accordance with the disclosure. The process (300) of FIG. 3 uses a machine learning model to Predict performance metrics and schedule workloads. The embodiments of FIG. 3 may be combined and may include or be included within the features and embodiments described in the other figures of the application. The features of FIG. 3 are, individually and as an ordered combination, improvements to the technology of computing systems, machine learning systems, and E&P computer systems. While the various blocks in the flowcharts are presented and described sequentially, one of ordinary skill will appreciate that at least some of the blocks may be executed in different orders, may be combined or omitted, and at least some of the blocks may be executed in parallel. Furthermore, the blocks may be performed actively or passively. For example, some blocks may be performed using polling or be interrupt driven. By way of an example, determination blocks may not have a processor process an instruction unless an interrupt is received to signify that condition exists. As another example, determinations may be performed by performing a test, such as checking a data value to test whether the value is consistent with the tested condition.

Turning to FIG. 3, in Block 302, a visualization request to visualize data is received. The visualization request may include client parameters and workload parameters that describe the client device, the workload data, the type of visualization, etc. The visualization request may be received by a scheduler application from a client application executing on a client computing system. The request may also include server parameters, for example, to request a server from a particular location or cloud services provider. In one embodiment, the data is subsurface data and the visualization request is a subsurface visualization request.

In Block 304, system parameters are obtained that are responsive to the request. The system parameters may be obtained by the scheduler application in response to receiving the request from the client computing system. The system parameters that are obtained may include multiple server parameters, client parameters, and workload parameters. At least some of the client parameters and workload parameters may be extracted from the request from the client computing system. In one embodiment, additional system parameters may be retrieved that were not provided by the request. For example, the workload parameters from the request may identify a specific workload, but not identify parameters for the size, depth, resolution, etc., of the workload.

In Block 306, predicted performance metrics are generated with a machine learning model using the system parameters. The predicted performance metrics may be generated by the scheduler application using the machine learning model. The system parameters that were obtained are input to the machine learning model. The machine learning model outputs a set of predicted performance metrics in response to receiving the input system parameters. The predicted performance metrics may be compared to performance thresholds to identify the server parameters that correspond to certain performance metrics for certain workloads and workload parameters.

In Block 308, a workload server is obtained using a workload server profile that is selected using the predicted performance metrics. The workload server executes a visualization workload to generate a visualization. In one embodiment, the visualization is a subsurface visualization and the visualization workload is a subsurface visualization workload.

In one embodiment, the scheduler application inputs multiple sets of system parameters into the machine learning model to generate multiple predicted performance metrics. The multiple predicted performance metrics are then compared against a set of thresholds (e.g., minimum frames per second, minimum initial lag, etc.) to select a set of server parameters that utilize a minimum level of hardware and satisfy minimum performance ratings specified in client service level agreements. A workload server profile may be generated using the selected server parameters along with the client parameters and workload parameters that were used to select the server parameters. A scheduling application may use the workload server profile to locate and connect to a server that satisfies the server parameters identified in the workload server profile. After connecting to the server, the scheduling application may load the workload application to the server to begin processing the workload and generating a visualization for the client computing system.

In Block 310, the visualization of the data is streamed, responsive to the visualization request, from the workload server to the client device. The visualization may be streamed as part of a remote desktop or in a browser window on the client computing system.

In one embodiment, the visualization is dynamically migrated from an initial graphics processor to a subsequent graphics processor in response to a utilization of the initial graphics processor failing to satisfy a threshold. The system may continuously monitor the utilization of a GPU by the workloads running on the GPU. When the GPU utilization by a workload crosses a threshold, the workload may be migrated. For example, a minimum utilization threshold of 40% may be used and when a virtualization workload drops to below 40% utilization of a GPU, the workload may be migrated to a different GPU. As another example a maximum utilization threshold of 50% may be used to migrate a visualization workload that is presently sharing a GPU to a GPU that is reserved for the visualization workload.

In one embodiment, training workload data may be obtained that includes training system parameters and training performance metrics of visualization workloads. The machine learning model may be trained to generate training predicted performance metrics from the training system parameters by updating the machine learning model based on errors between the training predicted performance metrics and the training performance metrics of the visualization workloads. The machine learning model may be a neural network that is updated using backpropagation and gradient descent. In one embodiment, the neural network of the machine learning model includes at least two fully connected layers of weights.

In one embodiment, training workload data may be obtained using data generated during the execution of training workloads for which a request was not received from a user of a client computing system. For example, a training visualization workload may be executed with the training system parameters on a training workload server to generate at least a portion of the training performance metrics.

In one embodiment, training workload data may be obtained from real requests. For example, performance metrics may be generated for the visualization of a workload that started in response to a request from a client computing system. The system parameters and the performance metrics for the workload may be stored as training workload data that may later be used to train or retrain the machine learning model.

FIGS. 4.1 and 4.2 show examples of sequences, systems, and interfaces in accordance with the disclosure. FIG. 4.1 shows an example of mapping GPU workloads to cloud infrastructure. FIG. 4.2 shows an example of migrating workloads between GPUs. The embodiments of FIGS. 4.1 and 4.2 may be combined and may include or be included within the features and embodiments described in the other figures of the application. The features and elements of FIGS. 4.1 and 4.2 are, individually and as a combination, improvements to the technology of computing systems, machine learning systems, and streaming media systems. The various features, elements, widgets, components, and interfaces shown in FIGS. 4.1 and 4.2 may be omitted, repeated, combined, and/or altered as shown. Accordingly, the scope of the present disclosure should not be considered limited to the specific arrangements shown in FIGS. 4.1 and 4.2.

The infrastructure for 3D visualization is dynamically selected based on offline profiling of the real workload with a representative benchmark using a machine learning model. The infrastructure choices involve the type and number of central processing units (CPUs), the type and number of graphic processing units (GPUs), memory size, etc. in the cloud. An operating system level virtualization container may be used to isolate multiple instances of the 3D visualization process from each other when executing in the same cloud virtual machine (VM).

Representative performance estimates are obtained for 3D visualization workloads (such as seismic visualizations using benchmarks). One or more embodiments may perform offline benchmarking on the representative datasets and use that for decision making for infrastructure when provisioning for 3D visualization workload. One or more embodiments may also allow partial GPUs for a single workload and use operating system level containers for isolation purposes. One or more embodiments may "migrate" the workload from one GPU to another based on the dynamic utilization. Additionally, one or more embodiments may be extended to infrastructure spanning multiple cloud (poly cloud) as well as hybrid cloud (on-premise+cloud) architectures.

With a virtual GPU (vGPU), a single GPU may be partitioned into many GPUs. The partitioning may be dynamic as well based on the profile of the dataset/usage. Combined with migration, one or more embodiments may replicate, repartition, and reassign with new partitioning of GPUs in the cloud. Additionally, modeling and understanding visualization workload performance on a variety of infrastructure allows for one or more embodiments to execute based on multiple types of service levels (e.g., base performance level, premium performance level, ultimate performance level). The system may predict performance on systems and configurations that were not tested to reduce the time and computation required for benchmarking. The system may deploy visualization workloads to untested systems and configurations based on the predicted performance of untested systems and configurations.

Three dimensional (3D) visualizations of oil and gas data are performed in a cloud computing system (the cloud) with virtual machines (VMs) and graphics processing units (GPUs) that are a part of the cloud. A GPU is a specialized electronic circuit designed to rapidly manipulate and alter memory to accelerate the creation of images in a frame buffer intended for output to a display device. Different visualization workloads may utilize different levels of resources to achieve acceptable performance levels (e.g., frame rates). The mapping of workloads to resources may be based on benchmarks. The benchmarks are automatically generated by a benchmarking system for multiple workloads with different workload parameters and multiple systems with different configurations.

Workload parameters may include one or more of different types of data (seismic data, well log data, etc.), different sizes of data (1 gigabyte, 10 gigabytes, 100 gigabytes, 1000 gigabytes, etc.), and different locations of data (remote data stored on a different computing system and local data stored with local hardware resources). System configurations may include options for GPUs, central processing units (CPUs), virtual machines (VMs), and memory. The benchmarking system includes hardware and/or software that automatically enumerate and identify the different configurations to be benchmarked and automatically perform the benchmarking process to create a database of benchmark information for the different configurations. The benchmarks may identify the performance of different workloads when executed on different computing platforms. Systems according to the disclosure may map workloads to computing platforms that meet minimum performance levels. Workloads may also be migrated between different computing platforms (e.g., from one VM/GPU combination to another) to improve performance and resource utilization. Additionally, a single GPU may be shared between multiple VMs and processes based on an allotted amount of time so that access to the GPU is time division multiplexed. Thus, generating a visualization in a VM means that the generation is allocated a time unit of the GPU.

FIGS. 4.1 and 4.2 show methods and systems using three phases. Phase 1 includes training the machine learning model by benchmarking workloads. The workloads may be 3D visualization access patterns, and the system may identify various 3D visualization data patterns used in oilfield domain and access patterns associated therewith. Visualization patterns for 3D visualization in the context of oil and gas include seismic visualization and well-bore visualization patterns. Seismic visualization patterns include panning slices of volumes, zooming in and out on specific regions of interest, changing color schemes for extracting meaningful information from raw data, etc. Well-bore visualization patterns include panning, zooming in and out, navigation, etc., of well-bore visualization images. The visualization patterns from users may dictate the access patterns and compute/storage demands for the visualization.

Server parameters for the servers in the benchmarking cloud (406) may include:
CPU, Vendor, Model
Number of CPU cores
GPU, Vendor, Model
System Memory
GPU memory, Size, Type
Operating System, version
Graphics Driver version
Client API version Categories and parameters for workloads may include:
type of data
  e.g. seismic grid, reservoir grid
dimensions of the seismic cube (and possibly other metadata)
  e.g. number of inlines, crosslines and depth lines.
data type—char/int/float16/float32
rendering window resolutions
  e.g., HD (high definition 1920 by 1080), 4K (3840 by 2160)
number of rendering contexts
  e.g. 1, 2, . . . .
Performance metrics, including output statistics, measurements, and performance levels, may include:
render time per frame graph—microseconds
average rendering frames per second (FPS)—number
latency for first render on load—milliseconds
CPU memory usage graph—megabytes (MBs) v/s time
GPU memory usage graph—MBs v/s time
number and size of data read requests per second graph
% CPU usage—system performance counter
% GPU usage—system performance counter Turning to FIG. 4.1, the workload database (402) stores the information to execute workloads on servers in the benchmarking cloud (406) under the control of the training system (404). The workload database (402) includes workloads having different types of data (seismic, well logs, etc.), with different sizes (1 gigabyte (GB), 10 GB, 100 GB, 1000 GB, etc.), with different locations (local data, remote data). The information in the workload database (402) may include the data for a workload as well as a script of user commands to perform a visualization.

The training system (404) may execute each workload from the information in the workload database (402) on multiple differently configured systems in the benchmarking cloud (406). The benchmarking cloud (406) includes multiple servers with different available options (graphics processing units (GPUs), central processing units (CPUs), virtual machines (VMs), memory, storage, physical location, etc.). The workloads maybe run on multiple configurations of these servers in the benchmarking cloud (406) in parallel.

During the execution of a workload, the systems in the benchmarking cloud (406) gather performance data (e.g., frames per second) that is stored in the performance database (408). From the performance data, a mapping from the tuples of "<workload, compute platform>" to performance is generated and stored in the performance database (408).

After training the machine learning model to predict the output performance metrics from the input system parameters, the training system (404) may predict performance metrics for server configurations and workloads that were not actually tested and benchmarked. Using the predictions for configurations that were not specifically tested reduces the time needed to develop the mapping of workloads and compute platforms to performance.

Phase 2 includes online decision making and optimal platform selection. Deciding the infrastructure for a 3D visualization workload may be based on workload parameters (e.g., dataset type and size); system administration preferences with respect to cost, user priority, etc.; and a database of infrastructure and performance mappings in the performance database (408) generated with the machine learning model. Additional factors may influence the choice of the computing platforms and configurations. Partial GPUs may be allowed by using operating system (OS) level virtualization containers. The use of partial GPU's may result in improved performance and reduced idle time of provisioned GPUs in the deployment cloud (430).

Turning again to FIG. 4.1, The client device (422) sends a request that includes the workload type and data set parameters (424) to the workload scheduler (428). The workload type and data set parameters (424) may include client parameters, server parameters, and workload parameters. The workload parameters may include values for data cube size, level of detail, file format, etc.

The workload scheduler (428) also receives the system administration preferences (426). In response to receiving the request from the client device (422), the workload scheduler (428) identifies a set of system parameters based on the workload type in data set parameters (424), the system administration preferences (426), and the mappings and performance metrics from the performance database (408). The system administration preferences (426) may include values for cost, performance levels, user priority levels, etc.

The workload scheduler (428) uses the system parameters to locate and obtain a deployment server in the deployment cloud (430), for example, by accessing a cloud services application programming interface (API) of the deployment cloud (430). The workload scheduler (428) may use server parameters that identify the CPU, memory, GPU, storage, etc., of the server to execute the workload. The workload scheduler (428) schedules the workload requested by the client device (422) on the server obtained from the deployment cloud (430). The deployment cloud (430) may be part of the same cloud infrastructure as the benchmarking cloud (406) and include multiple servers with different available options (graphics processing units (GPUs), central processing units (CPUs), virtual machines (VMs), memory, storage, physical location, etc.).

The server from the deployment cloud (430) obtained by the workload scheduler (428) executes the workload requested by the client device (422) and streams the visualization back to the client device (422). The client device (422) may send commands to the server executing the workload that controls the visualization. The server updates the visualization based on the commands from the client device (422) (re-slicing the geological data, panning, zooming, tilting, etc.).

Phase 3 includes dynamic migration of a visualization workload. Phase 3 includes an option to "migrate" the workload (which may also be referred to as an "app") from one Graphics processing unit "GPU" to another based on dynamic utilization. For example, if two GPUs are being used below a certain threshold (e.g., percent utilization), then the apps may be migrated to a single GPU. GPU migration may involve transfer of a large states and may save resources in the cloud both from a resource and a redundancy fault-tolerance perspective. Migration may also be from a more powerful GPU with more memory and compute units to less powerful GPU with less memory and fewer compute units. In some cases, which may be based on on-line profiling, workloads may be consolidated from multiple different VMs/GPUs to one VM/GPU to reduce the consumption of resources.

Turning to FIG. 4.2, The workload server (452) includes the graphics processor A (454) and the graphics processor B (456). Initially (pre-migration), the workload server (452) is executing the workload visualization A (462) on the graphics processor A (454) and the workload visualization B (464) on the graphics processor B (456). This system may identify that neither of the workloads are consuming more than a threshold amount of GPU resources and decide to consolidate the workloads. For example, the visualization A (452) may consume less than 40% of the resources of the graphic processor A (454). Similarly, the visualization B (464) may also be consuming less than 40% of the resources of the graphics processor B (456). The system then migrates visualization B (464) from the graphics processor B (456) to the graphics processor A (454). Post migration, the graphics processor A (454) executes both the visualization A (462) and the visualization B (464). The graphics processor A (454) may use time division multiplexing or time slicing of the resources of the graphics processor A (454) to execute multiple visualizations.

Embodiments disclosed herein may be implemented on a computing system. Any combination of mobile, desktop, server, router, switch, embedded device, or other types of hardware may be used. For example, as shown in FIG. 5.1, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the technology.

The computing system (500) in FIG. 5.1 may be connected to or be a part of a network. For example, as shown in FIG. 5.2, the network (520) may include multiple nodes (e.g., node X (522), node Y (524)). Each node may correspond to a computing system, such as the computing system shown in FIG. 5.1, or a group of nodes combined may correspond to the computing system shown in FIG. 5.1. By way of an example, embodiments of the technology may be implemented on a node of a distributed system that is connected to other nodes. By way of another example, embodiments of the technology may be implemented on a distributed computing system having multiple nodes, where each portion of the technology may be located on a different node within the distributed computing system. Further, one or more elements of the aforementioned computing system (500) may be located at a remote location and connected to the other elements over a network.

Although not shown in FIG. 5.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5.1. Further, the client device (526) may include and/or perform all or a portion of one or more embodiments of the technology.

The computing system or group of computing systems described in FIGS. 5.1 and 5.2 may include functionality to perform a variety of operations disclosed herein. For example, the computing system(s) may perform communication between processes on the same or different systems. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process; or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the technology. The processes may be part of the same or different applications and may execute on the same or different computing systems.

Rather than or in addition to sharing data between processes, the computing system performing one or more embodiments of the technology may include functionality to receive data from a user. For example, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the technology, may extract one or more data items from the obtained data. For example, the extraction may be performed as follows by the computing system in FIG. 5.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 5.1, while performing one or more embodiments of the technology, may perform data comparison. Data comparison may be used to compare two or more data values (e.g., A, B). For example, one or more embodiments may determine whether $A>B$, $A=B$, $A!=B$, $A<B$, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if $A>B$, B may be subtracted from A (i.e., $A-B$), and the status flags may be read to determine if the result is positive (i.e., if $A>B$, then $A-B>0$). In one or more embodiments, B may be considered a threshold, and A is deemed to satisfy the threshold if $A=B$ or if $A>B$, as determined using the ALU. In one or more embodiments of the technology, A and B may be vectors, and comparing A with B includes comparing the first element of vector A with the first element of vector B, the second element of vector A with the second element of vector B, etc. In one or more embodiments, if A and B are strings, the binary values of the strings may be compared.

The computing system in FIG. 5.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 5.1 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents a few examples of functions performed by the computing system of FIG. 5.1 and the nodes and/or client device in FIG. 5.2. Other functions may be performed using one or more embodiments of the technology.

While the technology has been described with respect to a limited number of embodiments, those skilled in the art, having benefit of this disclosure, will appreciate that other embodiments may be devised which do not depart from the scope as disclosed herein. Accordingly, the scope of the technology should be limited only by the attached claims.

What is claimed is:

1. A method comprising:
    receiving a visualization request to visualize data;
    obtaining system parameters responsive to the visualization request;
    generating predicted performance metrics with a machine learning model using the system parameters, wherein the machine learning model is trained to generate training predicted performance metrics from training system parameters by updating the machine learning model based on errors between the training predicted performance metrics and training performance metrics of visualization workloads;
    obtaining a workload server using a workload server profile selected using the predicted performance metrics, the workload server executing a visualization workload to generate a visualization; and
    streaming, from the workload server to a client device, the visualization of the data responsive to the visualization request.

2. The method of claim 1, further comprising
    dynamically migrating the visualization from an initial graphics processor to a subsequent graphics processor in response to a utilization of the initial graphics processor failing to satisfy a threshold.

3. The method of claim 1 comprising:
    obtaining training workload data comprising the training system parameters and the training performance metrics of the visualization workloads.

4. The method of claim 3, wherein obtaining the training workload data further comprises:
    executing a training visualization workload with the training system parameters on a training workload server to generate at least a portion of the training performance metrics.

5. The method of claim 3, wherein obtaining the training workload data further comprises:
    generating performance metrics of the visualization; and
    storing the system parameters and the performance metrics as at least a part of the training workload data.

6. The method of claim 1, wherein the system parameters comprise server parameters with hardware parameters and software parameters that comprise values for server location, server core count, server memory size, server network latency, server operating system, server partition size, server persistent storage size, server processor count, server processor type, server graphics processor unit (GPU) driver version, server GPU memory size, server GPU partition size, server GPU type, virtual machine core count, virtual machine memory size, virtual machine partition size, virtual machine persistent storage size, virtual machine GPU driver version, virtual machine GPU memory size, container persistent storage size, container memory size, container GPU memory size, and container core count.

7. The method of claim 1, wherein the system parameters comprise client parameters with hardware parameters and software parameters that comprise values for client location, idle time (time since last user input), client application core count, client application GPU memory size, client application memory size, client application persistent storage size, client application processor count, client application type, client network latency, client operating system, client system core count, client system memory size, client system persistent storage size, client system processor count, client system processor type, client system graphics processor unit (GPU) driver version, client system GPU memory size, and client system GPU type.

8. The method of claim 1, wherein the system parameters comprise workload parameters that comprise values for workload data location, workload application type, workload data depth, workload data resolution, workload data shape, workload data size, workload data type, workload type, and workload visualization type.

9. The method of claim 1, wherein the data is subsurface data, the visualization is a subsurface visualization, the visualization request is a subsurface visualization request, and the visualization workload is a subsurface visualization workload.

10. A system comprising:
a processor;
a memory;
an application stored in the memory that executes on the processor and is configured for:
receiving a visualization request to visualize data;
obtaining system parameters responsive to the visualization request;
generating predicted performance metrics with a machine learning model using the system parameters, wherein the machine learning model is trained to generate training predicted performance metrics from training system parameters by updating the machine learning model based on errors between the training predicted performance metrics and training performance metrics of visualization workloads;
obtaining a workload server using a workload server profile selected using the predicted performance metrics, the workload server executing a visualization workload to generate a visualization; and
streaming, from the workload server to a client device, the visualization of the data responsive to the visualization request.

11. The system of claim 10, wherein the application is further configured for:
dynamically migrating the visualization from an initial graphics processor to a subsequent graphics processor in response to a utilization of the initial graphics processor failing to satisfy a threshold.

12. The system of claim 10, wherein the application is further configured for:
obtaining training workload data comprising the training system parameters and the training performance metrics of the visualization workloads.

13. The system of claim 12, wherein obtaining the training workload data further comprises:
executing a training visualization workload with the training system parameters on a training workload server to generate at least a portion of the training performance metrics.

14. The system of claim 12, wherein obtaining the training workload data further comprises:
generating performance metrics of the visualization; and
storing the system parameters and the performance metrics as at least a part of the training workload data.

15. The system of claim 10, wherein the system parameters comprise server parameters with hardware parameters and software parameters that comprise values for server location, server core count, server memory size, server network latency, server operating system, server partition size, server persistent storage size, server processor count, server processor type, server graphics processor unit (GPU) driver version, server GPU memory size, server GPU partition size, server GPU type, virtual machine core count, virtual machine memory size, virtual machine partition size, virtual machine persistent storage size, virtual machine GPU driver version, virtual machine GPU memory size, container persistent storage size, container memory size, container GPU memory size, and container core count.

16. The system of claim 10,
wherein the system parameters comprise client parameters with hardware parameters and software parameters that comprise values for client location, idle time (time since last user input), client application core count, client application GPU memory size, client application memory size, client application persistent storage size, client application processor count, client application type, client network latency, client operating system, client system core count, client system memory size, client system persistent storage size, client system processor count, client system processor type, client system graphics processor unit (GPU) driver version, client system GPU memory size, and client system GPU type; and
wherein the system parameters comprise workload parameters that comprise values for workload data location, workload application type, workload data depth, workload data resolution, workload data shape, workload data size, workload data type, workload type, and workload visualization type.

17. A set of one or more non-transitory computer readable mediums comprising instructions that, when executed by a processor, are configured for:
receiving a visualization request to visualize data;
obtaining system parameters responsive to the visualization request;
generating predicted performance metrics with a machine learning model using the system parameters, wherein the machine learning model is trained to generate training predicted performance metrics from training system parameters by updating the machine learning model based on errors between the training predicted performance metrics and training performance metrics of visualization workloads;
obtaining a workload server using a workload server profile selected using the predicted performance metrics, the workload server executing a visualization workload to generate a visualization; and
streaming, from the workload server to a client device, the visualization of the data responsive to the visualization request.

18. The set of one or more non-transitory computer readable mediums of claim 17, further configured for:
dynamically migrating the visualization from an initial graphics processor to a subsequent graphics processor in response to a utilization of the initial graphics processor failing to satisfy a threshold.

19. The set of one or more non-transitory computer readable mediums of claim 17, further configured for:
obtaining training workload data comprising the training system parameters and training performance metrics of the visualization workloads.

20. The set of one or more non-transitory computer readable mediums of claim 19, wherein obtaining the training workload data further comprises:

executing a training visualization workload with the training system parameters on a training workload server to generate at least a portion of the training performance metrics.

\* \* \* \* \*